Sept. 23, 1941.  J. E. B. SWABACKER  2,256,657
PARENTERAL INJECTION UNIT
Original Filed Aug. 16, 1940
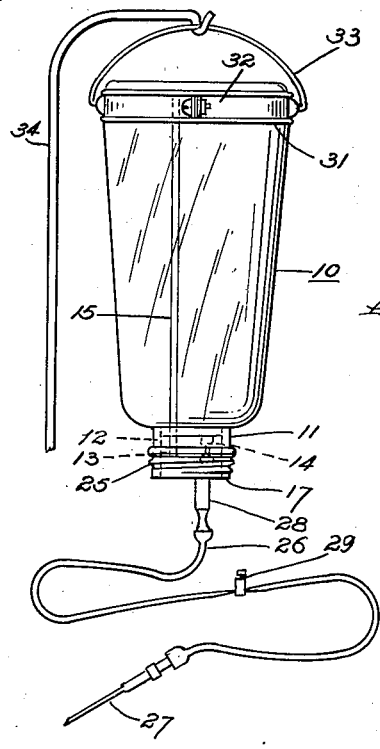
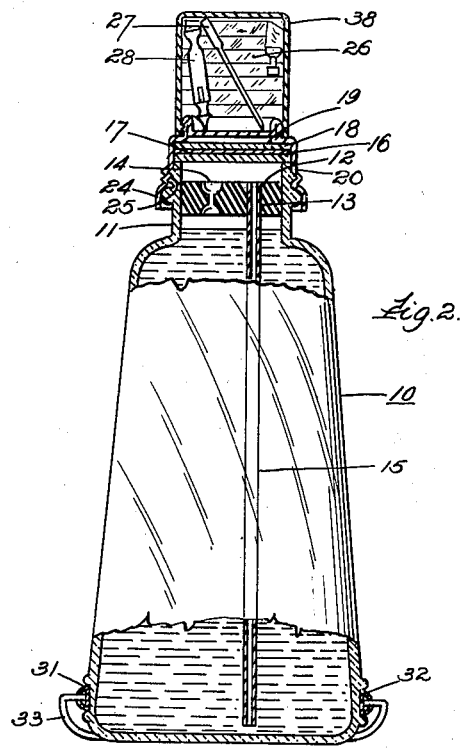
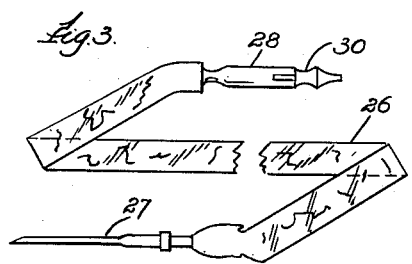
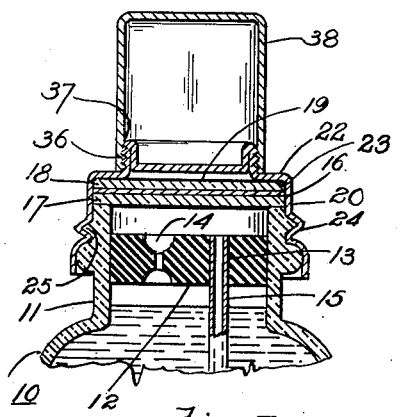
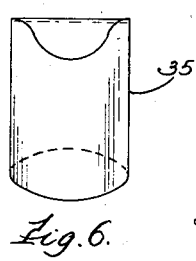
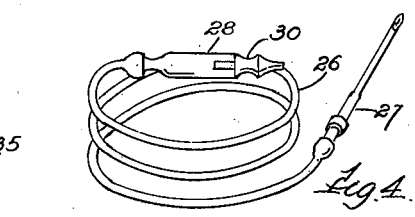
Inventor
John E. B. Swabacker,
by James R. McKnight
Attorney.

Patented Sept. 23, 1941

2,256,657

UNITED STATES PATENT OFFICE 2,256,657

PARENTERAL INJECTION UNIT

John E. B. Swabacker, Chicago, Ill.

Original application August 16, 1940, Serial No. 352,846. Divided and this application February 15, 1941, Serial No. 379,036

3 Claims. (Cl. 128—214)

This is a divisional application of the original application, Serial Number 352,846 filed in the United States Patent Office on August 16, 1940 for Parenteral injection unit.

My invention relates to a unit, preferably complete, in which all of the parts of an apparatus for giving a parenteral injection are associated and retained together in sterile condition in a convenient package for immediate use on a patient.

Heretofore in parenteral injections it has been the custom to assemble an apparatus from supplies on hand. A bottle of sterile solution was obtained. An air inlet means was sterilized and plugged into the container. A length of tubing, a connector for connecting the tubing to the container, and a needle were obtained from various sources, sterilized and put together. A clamping device was found and attached to the tubing for regulating the flow of the liquid. All these operations took time. Often parts were missing, then replacement caused further delay. Often parenteral injections are given in emergencies where saving of time is important in saving a patient's life. Another objection to the above assembly of parts is that old parts are used. This is particularly bad where old tubing is used, because it is difficult to successfully sterilize a long length of previously used tubing and remove foreign matter from the interior of the same.

It is among the objects of this invention to solve these problems by providing all or most of the parts of an apparatus for giving a parenteral injection in a single package or unit. My parenteral injection unit has sterile, previously unused tubing, which in its preferred form will be made of foldable or rollable and disposal material. My combination is so formed that it may be retained indefinitely in sterile condition and yet be immediately available and usuable at any time. My unit may be packed complete with all sterile parts, never used before, and after use may be disposed of, never to be used again for a parenteral injection. My invention also contemplates such other objects, advantages and capabilities as will later more fully appear and which are inherently possessed by my invention.

While I have shown in the accompanying drawing a preferred form of my invention, yet I wish it understood that the same is susceptible of modification and change without departing from the spirit of my invention.

Referring to the drawing, Fig. 1 is an elevational view of my injection unit in use; Fig. 2 is an elevational view partly in section of my injection unit showing the tubing and attachments stored in the chamber member attached to the closure; Fig. 3 is a detail view of my cellulose tubing assembly; Fig. 4 is a detail view of my rubber tubing assembly; Fig. 5 is a detail sectional view of my closure with removable chamber member; Fig. 6 is a detail view of my sealed envelope.

The embodiment selected to illustrate my invention comprises a container 10 containing a sterile solution for intravenous or subcutaneous injections, such as dextrose, glucose, sodium chloride or the like. Within the neck 11 of the container 10 a plug 12, preferably made of rubber, composition or the like, is positioned by friction grip. Spaced openings 13 and 14 extend vertically through said plug 12, and in opening 13 is positioned the upper end of hollow air tube 15 of glass or other suitable material. The tube 15 extends downwardly within container 10, with its lower end above the bottom of the container. Any suitable means for supplying air to the container 10 may be provided.

A washer 16 of compressible material such as rubber, composition or the like is positioned across the open top 17 of the container 10. A metal disc 18 is positioned on top of washer 16. Another compressible washer 19 is positioned on top of metal disc 18. A closure 20 has a lower outwardly extending peripheral flange 22 forming a seat 23 so that when the screw threads 24 of the closure engage the screw threads 25 of the neck 11 of the container, the seat 23 bears down against the top compressible washer 19 forming a seal therewith. Pressure is also exerted downward against metal disc 18 and lower compressible washer 16 so that the latter forms a seal with the top 17 of the container 10.

In this invention the closure 20 has screw threads 36 adapted to be engaged by screw threads 37 of a separate chamber member 38.

A suitable length of sterile tubing 26 has attached to one end a sterile needle 27 and to the other end a sterile connector 28. A clamp 29 for regulating the flow within the tubing 26 is attached to the tubing 26.

The tubing 26 is rolled or folded and in this form the chamber member 38 is adapted to removably house the tubing 26, and when desired the attachments 27, 28 and 29. In this invention the tubing and attachments may be withdrawn before the container 10 is unsealed by removal of closure 20.

In the preferred embodiment my tubing 26 is made of cellulose or other disposable material that may be folded or rolled. It is within the contemplation of my invention that the tubing 26 may be of rubber or composition of small enough size to be rolled to fit within chamber member 38.

When the physician desires to use my unit for an injection, all that need be done is to remove chamber member 38, unscrew closure 20 from container 10, remove washers 16 and 19 and disc 18 and insert connector 28 into opening 14 of plug 12. Opening 14 is inwardly and then outwardly flared to form a grip for the recessed head 30 of the connector 28.

Adjacent the bottom of the container 10 in the lower side walls a circular recess 31 is provided within which is held a band 32 to which is attached a swingable bale 33. The container 10 may then be inverted with the bale 33 held in a standard 34. The needle 27 is inserted into the patient, the clamp 29 is adjusted, air flows through tube 15 and the contents of the container pass through tubing 26 to the patient.

Upon the completion of the injection, the entire unit, including the container and tubing, may be thrown away or otherwise disposed of, never to be used again for an injection operation.

My combination may also provide for a sealed envelope 35 into which the rolled or folded tubing and the attachments may be placed within the cap portion of the closure. This would act to insure that the tubing and attachments remain sterile until used in the injection operation.

It is also within the contemplation of my invention that the needle, connector or clamp, or all or any one of these attachments may be omitted from the chamber member 38 and be attached to the tubing upon the removal of the same from the chamber member.

Parenteral in this application is used in the sense of including intravenous, subcutaneous and intramuscular injections.

Having thus described my invention, I claim:

1. In combination with a container having sterile injection solution therein, air supply means, and a removable closure for sealing said container, a chamber member removably attached to said closure, a length of sterile previously unused tubing made of disposable material, said tubing folded into a compact form, said tubing in said compact form removably positioned in said chamber member, means for attaching one end of said tubing to said container upon the removal of the closure from the container, and an injection needle attached to the other end of said tubing.

2. In combination with a container having sterile injection solution therein, air supply means, and a removable closure for sealing said container, a chamber member removably attached to said closure, a length of sterile previously unused tubing made of disposable material, said tubing folded into a compact form, said tubing in said compact form removably positioned in said chamber member, means for attaching one end of said tubing to said container upon the removal of the closure from the container, the other end of said tubing adapted to receive an injection needle.

3. A sterile previously unused parenteral injection unit comprising a container having sterile injection solution therein, air supply means, and a removable closure for sealing said container, a chamber member removably sealed to said closure, a length of sterile, previously unused tubing arranged in compact form, a sterile connector attached to one end of said tubing and a sterile needle attached to the other end of said tubing, said tubing, connector and needle positioned within said chamber member, said chamber member adapted to be withdrawn from said closure prior to the removal of the closure from the container so that said tubing, connector and needle may be removed from said chamber member and be available for use with said container immediately upon withdrawal of the closure therefrom.

JOHN E. B. SWABACKER.